United States Patent
Giroux et al.

(10) Patent No.: US 11,365,562 B2
(45) Date of Patent: Jun. 21, 2022

(54) SLIDING WINDOW ASSEMBLY

(71) Applicant: Lippert Components, Inc., Elkhart, IN (US)

(72) Inventors: Éric Giroux, Québec (CA); Adrien Beaudoin, Québec (CA); Jean-Sebastien Belisle, Québec (CA)

(73) Assignee: Lippert Components, Inc., Elkhart, IN (US)

( * ) Notice: Subject to any disclaimer, the term of this patent is extended or adjusted under 35 U.S.C. 154(b) by 28 days.

(21) Appl. No.: 16/929,773

(22) Filed: Jul. 15, 2020

(65) Prior Publication Data
US 2021/0017792 A1      Jan. 21, 2021

Related U.S. Application Data

(60) Provisional application No. 62/874,091, filed on Jul. 15, 2019.

(51) Int. Cl.
*E05B 65/08*      (2006.01)
*E05B 7/00*      (2006.01)
(Continued)

(52) U.S. Cl.
CPC ............ *E05B 65/0835* (2013.01); *E05B 7/00* (2013.01); *E05D 15/0686* (2013.01);
(Continued)

(58) Field of Classification Search
CPC ... E05B 65/0835; E05B 7/00; E05D 15/0686; E06B 3/4609; E05Y 2900/148; B60J 1/16; B60J 1/1853
See application file for complete search history.

(56) References Cited

U.S. PATENT DOCUMENTS

| 4,691,474 A * | 9/1987 | Rokicki ............. E05D 15/1013 49/220 |
| 4,726,145 A * | 2/1988 | Rokicki ............. E05D 15/1013 49/220 |

(Continued)

FOREIGN PATENT DOCUMENTS

| EP | 1 719 651 | 11/2006 |
| EP | 2 453 090 | 5/2012 |

(Continued)

OTHER PUBLICATIONS

International Search Report and Written Opinion dated Oct. 26, 2020 issued in PCT International Patent Application No. PCT/IB2020/056664, 13 pp.

*Primary Examiner* — Justin B Rephann
(74) *Attorney, Agent, or Firm* — Nixon & Vanderhye P.C.

(57) ABSTRACT

A sliding window assembly includes a frame with a track, and a sliding window portion disposed in the frame and displaceable in the track between a closed position and an open position. The sliding window portion includes a handle pivotable between a lock position and a slide position, and a driving pin coupled with the handle and engaging the track. The driving pin defines a pivot axis for the handle. A guide pin spaced from the driving pin is selectively engageable with the track when the handle is pivoted from the lock position to the slide position. With the handle in the slide position, the sliding window portion is displaceable from its closed position to an open position.

9 Claims, 5 Drawing Sheets

(51) Int. Cl.
  *E06B 3/46*   (2006.01)
  *E05D 15/06*  (2006.01)
  *B60J 1/18*   (2006.01)
(52) U.S. Cl.
  CPC .......... *E06B 3/4609* (2013.01); *B60J 1/1853* (2013.01); *E05Y 2900/148* (2013.01); *E05Y 2900/55* (2013.01)

(56) References Cited

U.S. PATENT DOCUMENTS

| | | |
|---|---|---|
| 5,799,444 A | 9/1998 | Freimark et al. |
| 7,464,501 B2 | 12/2008 | Arimoto et al. |
| 7,568,312 B2 | 8/2009 | Dufour et al. |
| 8,469,437 B2 | 6/2013 | Zanetti et al. |
| 8,578,654 B2 | 11/2013 | Rao et al. |
| 9,487,065 B2 | 11/2016 | Bender |
| 9,931,911 B2 | 4/2018 | Hick |
| 2006/0032140 A1* | 2/2006 | Arimoto ............... E05F 15/646 49/209 |
| 2006/0260205 A1* | 11/2006 | Dufour ................. B60J 1/1853 49/413 |
| 2008/0100093 A1* | 5/2008 | Seiple ................... B60J 1/2036 296/146.16 |
| 2009/0038228 A1* | 2/2009 | Lee ........................... E06B 7/23 49/360 |
| 2010/0107505 A1 | 5/2010 | Schreiner et al. |
| 2011/0173893 A1* | 7/2011 | Zanetti ................. E05F 15/632 49/363 |
| 2012/0167469 A1 | 7/2012 | Maltaverne et al. |
| 2016/0114655 A1* | 4/2016 | Hick ........................ B60J 1/16 49/127 |

FOREIGN PATENT DOCUMENTS

| | | |
|---|---|---|
| FR | 2 833 209 | 6/2003 |
| GB | 2 298 445 | 9/1996 |
| GB | 2 556 360 | 5/2018 |

* cited by examiner

SLIDING WINDOW ASSEMBLY

CROSS-REFERENCES TO RELATED APPLICATIONS

This application claims the benefit of U.S. Provisional Patent Application No. 62/874,091, filed Jul. 15, 2019, the entire content of which is herein incorporated by reference.

STATEMENT REGARDING FEDERALLY SPONSORED RESEARCH OR DEVELOPMENT (NOT APPLICABLE)

BACKGROUND

The invention relates to a sliding window assembly and, more particularly, to a sliding window assembly with a pivot handle that facilitates opening, sliding and flush closing.

Sliding window assemblies are used in land and marine environments to provide for easily opening and closing a section of a window. Sliding windows are used for rear cab windows, side cab windows, bus driver windows, etc. In a flush slider assembly, with the window in a closed position, the window panes (or the window and frame) are substantially flush defining a planar surface. The planar/flush closed window provides a much cleaner and desirable appearance.

In a typical flush slider assembly, the window panel is usually cooperable with a jogged track or pathway to be displaced across and forward into the flush configuration. The configurations using a jogged track, however, are typically expensive to manufacture and are susceptible to design defects that make it more difficult to close the window.

The devices described above, however, have some limitations or drawbacks. In particular, the known devices are constrained to use mobile elements of reduced thickness, typically between 2 and 6 millimeters, because greater thicknesses would lead to excessive encumbrance of the mobile element during translation in the curvilinear section, such as to prevent its complete entry inside the frame opening.

BRIEF SUMMARY

The sliding window assembly of the described embodiments can be used in a multitude of land and marine environments. When closed, the sliding portion of the glass may be flush with the frame or with an adjacent fixed portion of the window, giving the entire system a much cleaner appearance. The displacement and articulation of the glass also provides a tight seal between the frame and the slide portion of the glass. As a result, there can be a reduction in noise external to the vehicle, and water infiltration can be prevented. Additionally, the described embodiments can accommodate mobile elements of greater thicknesses, typically between 2 and 18 millimeters or more.

In an exemplary embodiment, a sliding window assembly includes a frame including a track, and a sliding window portion disposed in the frame and displaceable in the track between a closed position and an open position. The sliding window portion includes a leading end and a trailing end with a handle pivotally coupled with the leading end that is pivotable between a lock position and a slide position. A first guide pin is disposed on the trailing end and engaging the frame, and a driving pin coupled with the handle and engaging the track defines a pivot axis for the handle. A locking assembly is coupled with the handle and includes a second guide pin displaceable in a forward transition region. The second guide pin is spaced from the driving pin, and the second guide pin is selectively engageable with the track via the forward transition region when the handle is pivoted from the lock position to the slide position.

The sliding window portion may also include a rearward transition region integral with the frame adjacent the trailing end of the sliding window portion, where the first guide pin engages the rearward transition region when the sliding window portion is in the closed position. The rearward transition region may include a transition track that extends from an inline position retracted from the track to a track-aligned position in alignment with the track. In this context, the transition track may be substantially S-shaped. The sliding window portion may also include a trailing end washer bearing positioned between the trailing end and the transition track, where the first guide pin extends through the trailing end washer bearing.

The forward transition region may include a channel with a first leg substantially perpendicular to the track and a second leg aligned with the track. With the sliding window portion in the closed position and the handle in the lock position, the driving pin and the second guide pin may be disposed in the first leg, and when the handle is pivoted to the slide position, the driving pin and the second guide pin may be displaced into the second leg in alignment with the track.

With the sliding window portion in the closed position and the handle in the lock position, the driving pin and the second guide pin may be aligned and substantially perpendicular to the track. When the handle is pivoted to the slide position, the driving pin and the second guide pin may be aligned and in alignment with the track.

The sliding window portion may also include a leading end washer bearing positioned between the handle and the forward transition region, where the driving pin and the second guide pin extend through the leading end washer bearing.

In another exemplary embodiment, a sliding window assembly includes a frame with a track, and a sliding window portion disposed in the frame and displaceable in the track between a closed position and an open position. The sliding window portion includes a leading end and a trailing end and is provided with a handle pivotally coupled with the leading end that is pivotable between a lock position and a slide position. A driving pin coupled with the handle and engaging the track defines a pivot axis for the handle. A guide pin spaced from the driving pin is selectively engageable with the track when the handle is pivoted from the lock position to the slide position.

BRIEF DESCRIPTION OF THE DRAWINGS

These and other aspects and advantages will be described in detail with reference to the accompanying drawings, in which.

DETAILED DESCRIPTION

Figure 1:
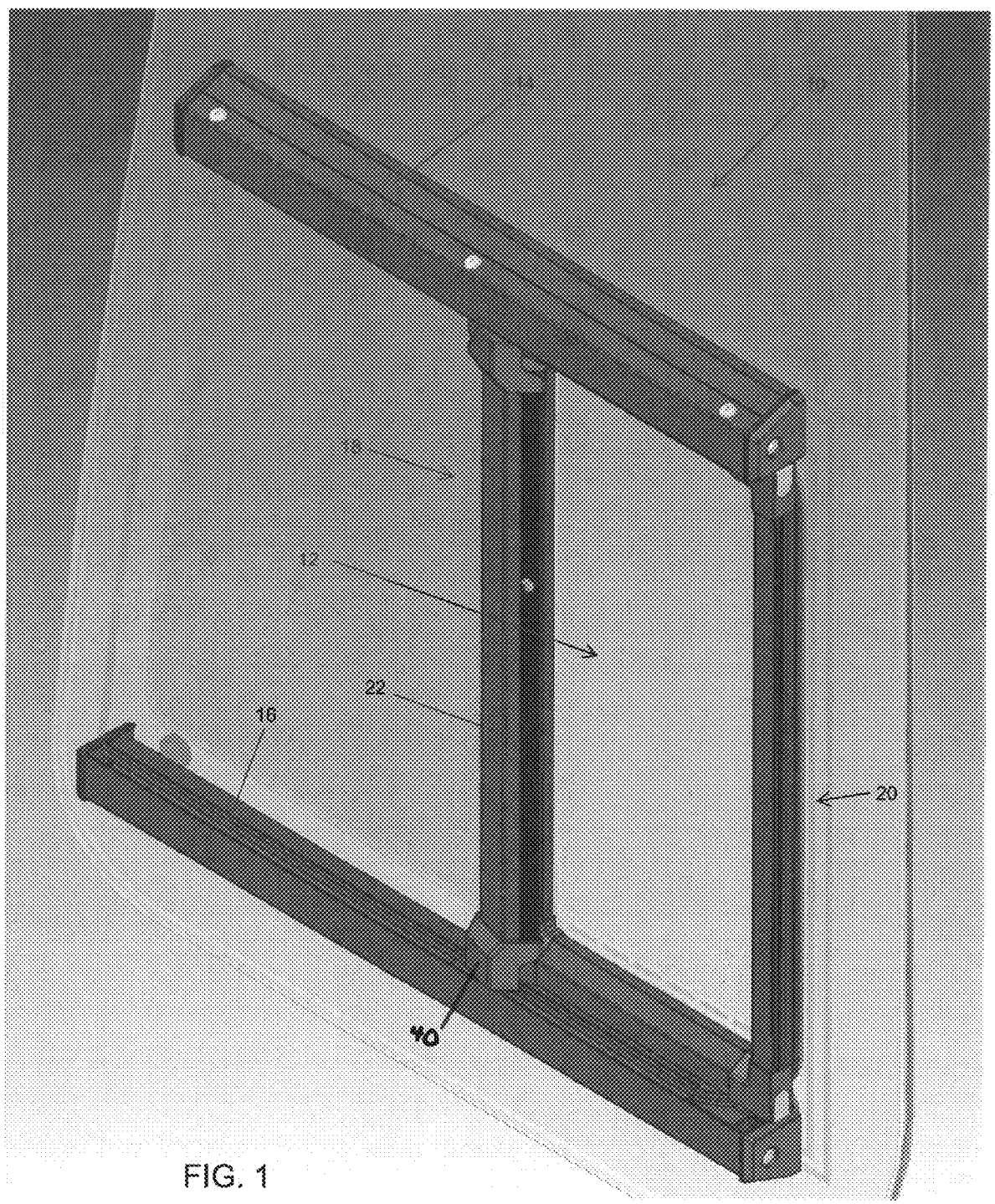
FIG. 1 is a perspective view showing the sliding window assembly in a closed position.

FIG. 1 is a perspective view of a sliding window assembly 10 with a sliding window portion 12 in a closed position. The sliding window portion 12 is disposed in a window frame 14 including a groove 15 (FIG. 4) securing a track 16. Although only two sides of the window frame 14 are shown in FIG. 1, the window frame may be constructed with top and bottom members as well (or even full perimeter frame). Additionally, a fixed window portion may form part of the sliding window assembly, where the sliding window portion 12 is aligned with and flush relative to the fixed window portion in the closed position, whereas the sliding window assembly enables the sliding window portion to be displaced inward to at least partially overlay the fixed window portion in an open position.

Figure 2:
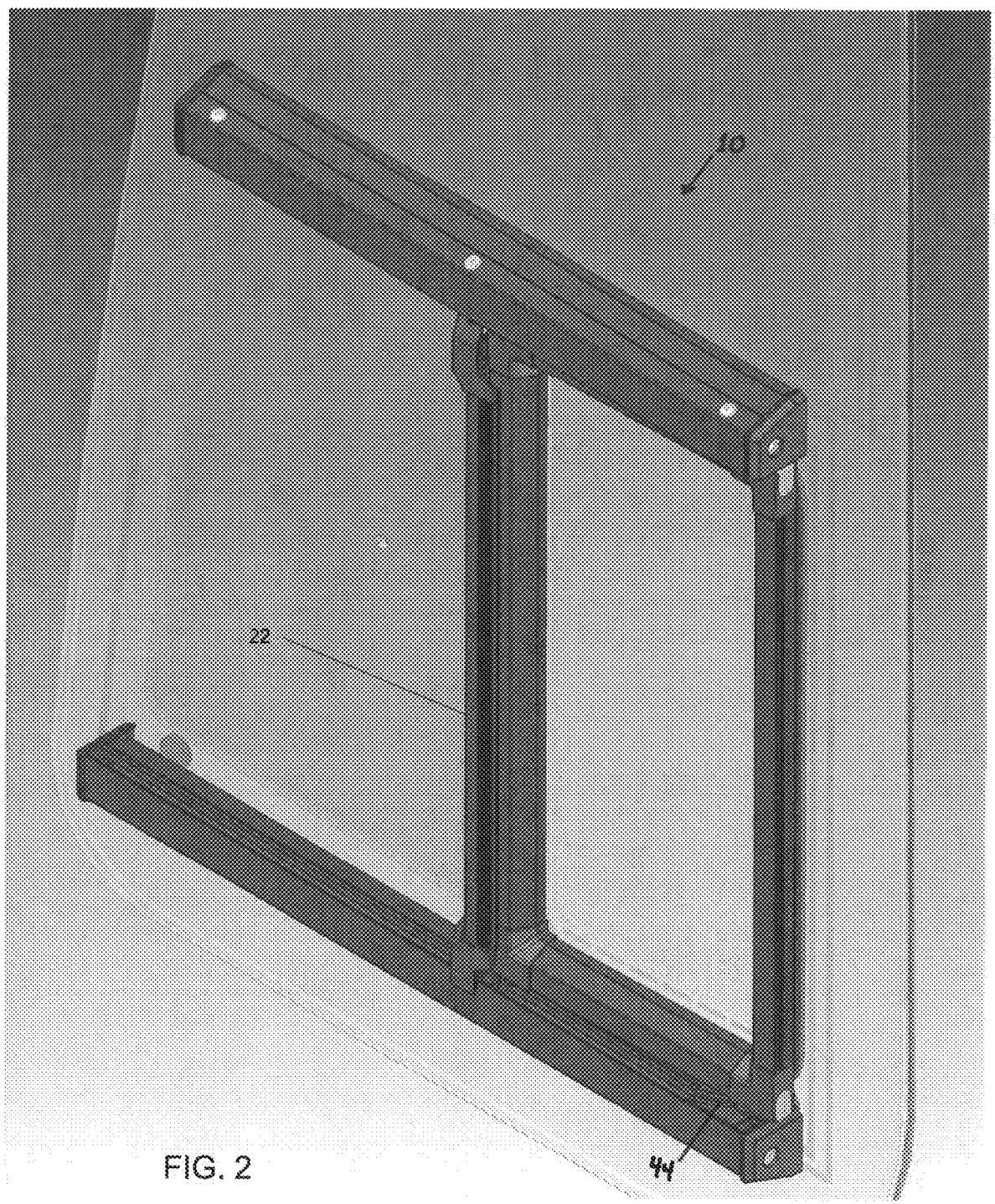
FIG. 2 shows the sliding window assembly with the handle being pivoted to a slide position.
Figure 3:
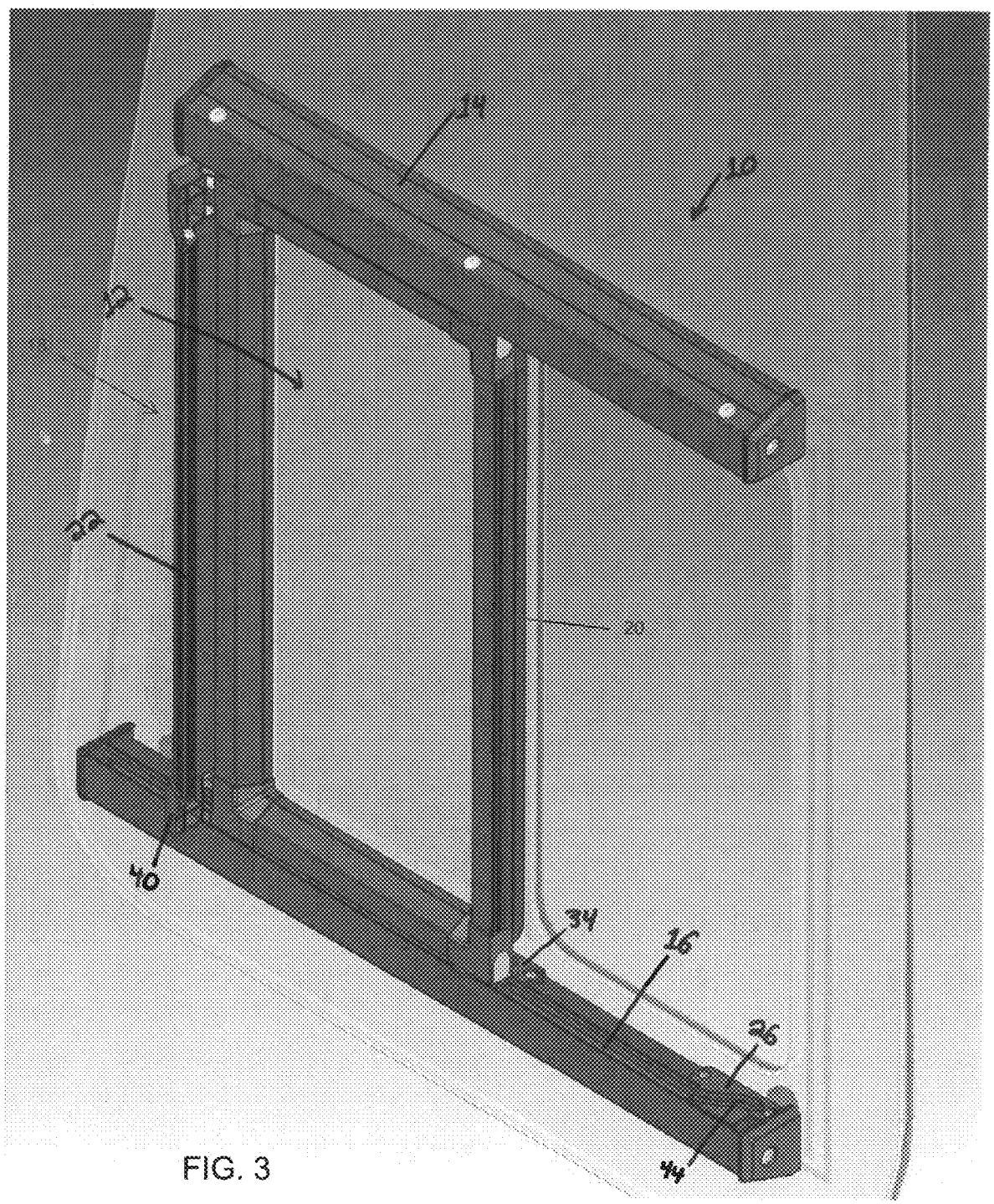
FIG. 3 shows the sliding window assembly with the sliding window portion in an open position.

The sliding window portion 12 is displaceable in the track 16 between the closed position (FIG. 1) and the open position (FIG. 3). The sliding window portion 12 includes a leading end 18 and a trailing end 20. A handle 22 is pivotally coupled with the leading end 18 between a locked position and a slide position. FIG. 1 shows the handle 22 in the locked position, and FIG. 2 shows the handle 22 in the slide position.

Figure 4:
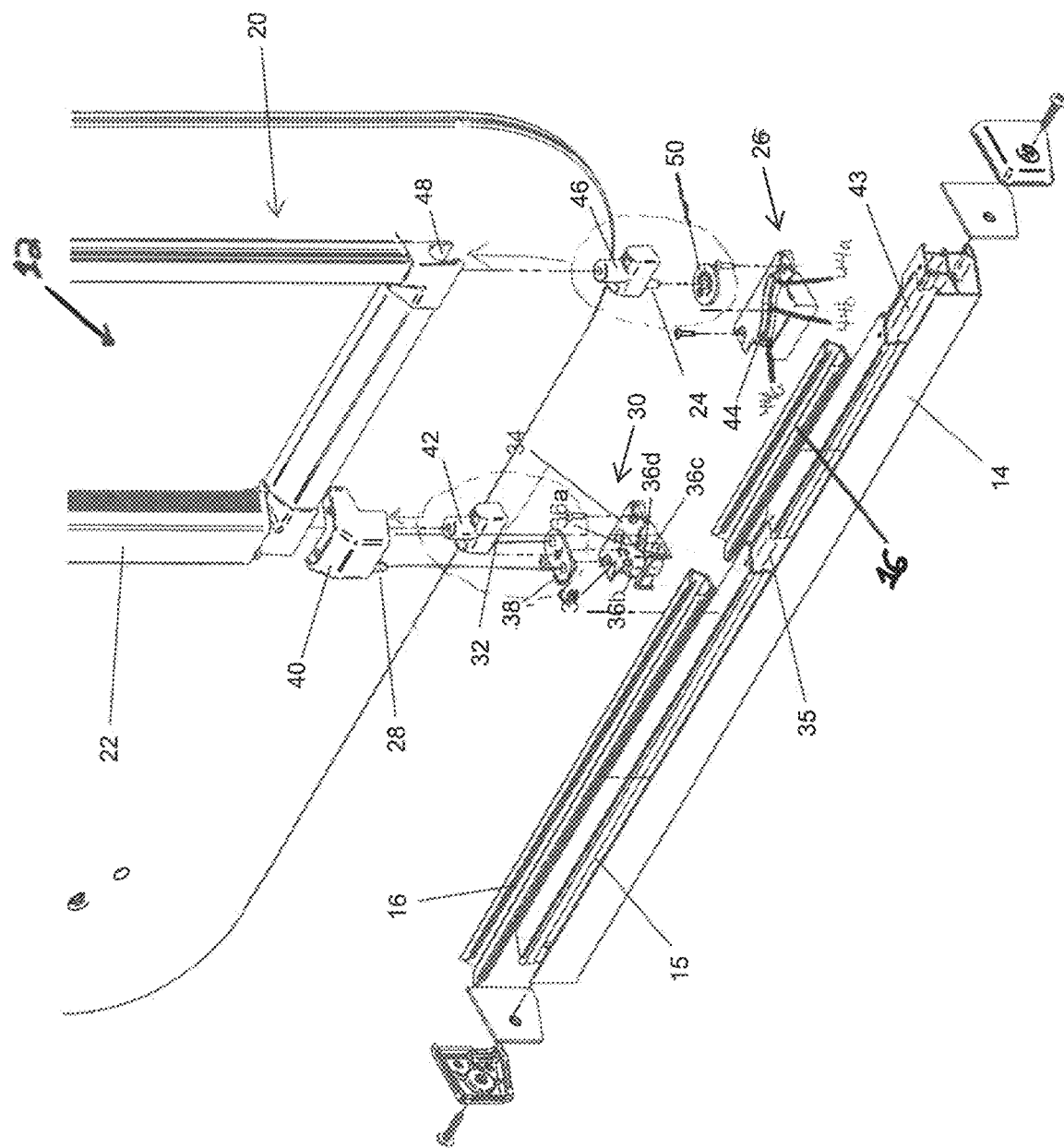
FIG. 4 shows details of the sliding window assembly components.

FIG. 4 shows details of the sliding window portion 12. The handle 22 is pivotally coupled with leading end 18 and is pivotable between the locked position and the slide position. A first guide pin 24 is disposed on the trailing end 20 and engages the frame 14 via a rearward transition region 26 when the sliding window portion 12 is in the closed position. A second guide pin 32 is disposed on the leading end 18 and is coupled with a driving pin 28 via a washer bearing 38. The driving pin 28 is an extension of the handle 22 and engages the track 16 through rotation of the handle 22 via a locking assembly 30. The driving pin 28 defines a pivot axis for the handle 22. The second guide pin 32 engages a forward transition region 34. The locking assembly 30 includes the second guide pin 32 that is displaceable in the forward transition region 34, which may be formed or molded monolithically with the track 16. FIG. 4 shows an alternative embodiment where the forward transition region is a removable plate that is secured to the frame 14 in a first recess 35 by suitable connectors. As shown, the second guide pin 32 is spaced from the driving pin 28, whereby pivoting of the handle 22 causes displacement of the second guide pin 32.

The second guide pin 32 is selectively engageable with the track 16 via the forward transition region 34 when the handle 22 is pivoted on the driving pin 28 from the locked position to the slide position.

Figure 5:
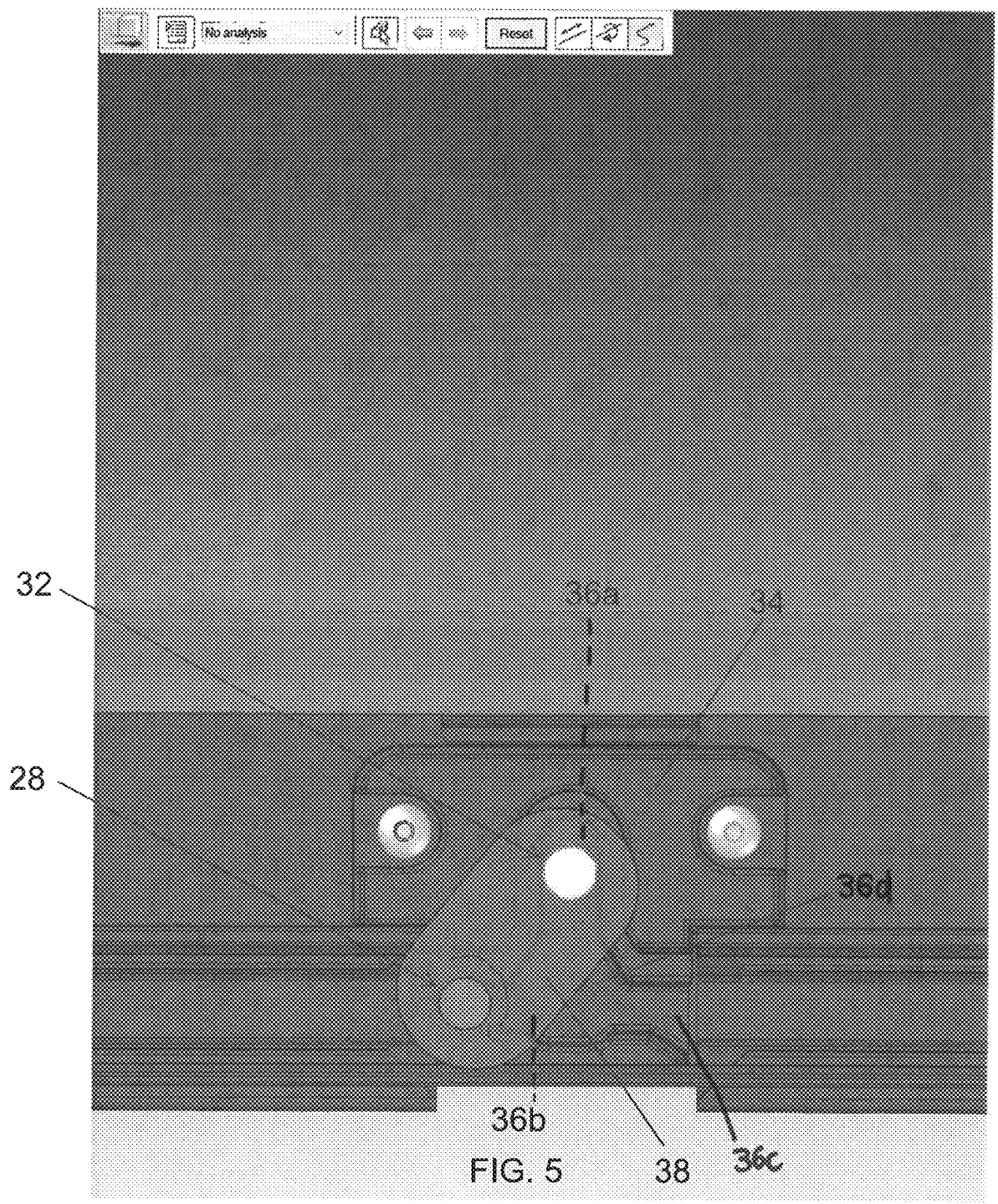
FIG. 5 is a close-up view of the forward transition region and leading end washer bearing.

With reference to FIG. 5 and continued reference to FIG. 4, the first transition region 34 includes an L-shaped or curved channel 36 with a first leg 36a oriented substantially perpendicular to the track 16 and a second leg 36b aligned with the track 16. In this context, with the sliding window portion 12 in the closed position, and the handle 22 in the lock position, the driving pin 28 and second guide pin 32 are disposed in the first leg 36a of the L-shaped channel 36. When the handle 22 is pivoted to the slide position (rotated clockwise on driving pin 28 in FIG. 4), the driving pin 28 and the second guide pin 32 are displaced into the second leg 36b in alignment with the track 16. That is, the second guide pin 32 translates in the first leg 36a of the L-shaped channel 36 until the driving pin 28 and the second guide pin 32 are positioned into the second leg 36b, which is aligned with the track 16, after which the driving pin 28 and the second guide pin 32 are displaceable linearly in the track 16. The channel 36 thus guides the pins 28, 32 into alignment with the track 16.

The locking assembly 30 may further include a leading end washer bearing 38 positioned between the handle 22 and the forward transition region 34. The driving pin 28 and the second guide pin 32 extend through the leading end washer bearing 38. The leading end washer bearing 38 is dimensioned larger than a width of the track 16 and as such rides on top of the track 16 when the sliding window portion 12 is displaced to its open position. The larger dimension of the end washer bearing 38 prevents it from falling into the track 16, which prevents binding of the sliding window portion 12. The washer bearing has a shoulder that applies leverage to the interior of the track 16 during rotation of the handle 22 at a transition state between locked and sliding positions. The leading end washer bearing 38 may be made of a material that facilitates sliding between the leading end washer bearing 38 and the track 16. For example, the leading end washer bearing 38 may be made of semi-crystalline thermoplastics like Acetals, nylons or polypropylenes.

The driving pin 28 may form part of a handle connector 40 or the like that is secured directly to the handle 22. Additionally, the second guide pin 32 may form part of a guide pin housing 42 cooperable with the connector 40. In other embodiments, the driving pin 28 and second guide pin 32 may be integrated with the sliding window portion 12 more directly or by other suitable methods.

The rearward transition region 26 may be formed or molded monolithically with the track 16. FIG. 4 shows an alternative embodiment where the rearward transition region is a removable plate secured to the frame 14 in a second recess 43 by suitable connectors. The rearward transition region includes a transition track 44 that extends from an in-line position retracted from the track 16 to a track-aligned position in alignment with the track 16. As shown, the transition track 44 is substantially S-shaped. That is, the transition track 44 is configured to guide the first guide pin 24 into the track 16 as the sliding window portion 12 is displaced toward the open position. The track 44 thus includes a curved portion 44a connected to the in-line retracted position, an angled portion 44b extending away from the in-line retracted position, and another curved portion 44c to align the transition track 44 with the track 16 in or secured to the frame 14. These multiple turns and angled section of the transition track 44 define a substantial S-shape.

The first guide pin 24 may form part of a pin housing 46 that is securable in a corresponding channel 48 adjacent the trailing end 20. In other embodiments, the first guide pin 24 may be integrated with the sliding window portion 12 more directly or by other suitable methods. A trailing end washer bearing 50 may be positioned between the trailing end 20 and the transition track 44, where the first guide pin 24 extends through the trailing end washer bearing 50. The trailing end washer bearing 50 is configured to glide on the rearward transition region 26 and on top of the track 16. Like the leading end washer bearing 38, the trailing end washer bearing 50 is dimensioned larger than the track 16 to maintain the level of the sliding window portion 12 during displacement between the closed and open positions, and also prevents trailing end washer bearing 50 from falling into the track 16 and creating binding of the sliding window portion 12.

The forward transition region 34 also includes a rear channel 36c in alignment with the second leg 36b of the L-shaped channel 36. The rear channel 36c provides a continuous path for the first guide pin 24 to pass over/through the forward transition region 34 when the sliding window portion 12 is displaced to its open position. In the closed position, the driving pin 28 applies pressure in the forward transition region 34 on a recessed surface 36d between the second leg 36b and the rear channel 36c (see also FIG. 5).

As noted, with reference to FIGS. 1 and 2, as the handle 22 is pivoted from the lock position to the slide position, the driving pin 28 and the second guide pin 32 shift in the forward transition region 34 from an orientation substantially perpendicular to the track 16 to an orientation in alignment with the track 16. The leading end 18 of the sliding window portion 12 is thus displaced inwardly relative to the frame 14 and slightly in the direction of the track 16 upon rotation of the handle 22. With the handle 22 in the slide position, the sliding window portion 12 is displaceable to its open position. The first guide pin 24 follows the transition track 44 into the track 16 for displacement with the sliding window portion 12.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A sliding window assembly comprising:
a frame including a track; and
a sliding window portion disposed in the frame and displaceable in the track between a closed position and an open position, the sliding window portion including a leading end and a trailing end and comprising:
  a handle pivotally coupled with the leading end, the handle being pivotable between a lock position and a slide position,
  a first guide pin disposed on the trailing end and engaging the frame,
  a driving pin coupled with the handle and engaging the track, the driving pin defining a pivot axis for the handle, and
  a locking assembly coupled with the handle and including a second guide pin displaceable in a forward transition region, wherein the second guide pin is spaced from the driving pin,
wherein the second guide pin is selectively engageable with the track via the forward transition region when the handle is pivoted from the lock position to the slide position,
wherein with the sliding window portion in the closed position and the handle in the lock position, the driving pin and the second guide pin are aligned and substantially perpendicular to the track, and wherein when the handle is pivoted to the slide position, the driving pin and the second guide pin are aligned and in alignment with the track.

2. A sliding window assembly according to claim 1, wherein the sliding window portion further comprises a rearward transition region secured to the frame adjacent the trailing end of the sliding window portion, and wherein the first guide pin engages the rearward transition region when the sliding window portion is in the closed position, the rearward transition region comprising a transition track that extends from an inline position retracted from the track to a track-aligned position in alignment with the track.

3. A sliding window assembly according to claim 2, wherein the transition track is substantially S-shaped.

4. A sliding window assembly according to claim 2, wherein the sliding window portion further comprises a trailing end washer bearing positioned between the trailing end and the transition track, and wherein the first guide pin extends through the trailing end washer bearing.

5. A sliding window assembly according to claim 1, wherein the sliding window portion further comprises a leading end washer bearing positioned between the handle and the forward transition region, wherein the driving pin and the second guide pin extend through the leading end washer bearing.

6. A sliding window assembly comprising:
a frame including a track; and
a sliding window portion disposed in the frame and displaceable in the track between a closed position and an open position, the sliding window portion including a leading end and a trailing end and comprising:
  a handle pivotally coupled with the leading end, the handle being pivotable between a lock position and a slide position,
  a first guide pin disposed on the trailing end and engaging the frame,
  a driving pin coupled with the handle and engaging the track, the driving pin defining a pivot axis for the handle, and
  a locking assembly coupled with the handle and including a second guide pin displaceable in a forward transition region, wherein the second guide pin is spaced from the driving pin,
wherein the second guide pin is selectively engageable with the track via the forward transition region when the handle is pivoted from the lock position to the slide position,
wherein the forward transition region includes a channel with a first leg substantially perpendicular to the track and a second leg aligned with the track, wherein with the sliding window portion in the closed position and the handle in the lock position, the driving pin and the second guide pin are disposed in the first leg, and wherein when the handle is pivoted to the slide position, the driving pin and the second guide pin are displaced into the second leg in alignment with the track.

7. A sliding window assembly comprising:
a frame including a track; and
a sliding window portion disposed in the frame and displaceable in the track between a closed position and an open position, the sliding window portion including a leading end and a trailing end and comprising:
  a handle pivotally coupled with the leading end, the handle being pivotable between a lock position and a slide position,
  a driving pin coupled with the handle and engaging the track, the driving pin defining a pivot axis for the handle, and
  a guide pin spaced from the driving pin, wherein the guide pin is selectively engageable with the track when the handle is pivoted from the lock position to the slide position,
wherein with the sliding window portion in the closed position and the handle in the lock position, the driving pin and the guide pin are aligned and substantially perpendicular to the track, and wherein when the handle is pivoted to the slide position, the driving pin and the guide pin are aligned and in alignment with the track.

8. A sliding window assembly comprising:
a frame including a track; and
a sliding window portion disposed in the frame and displaceable in the track between a closed position and an open position, the sliding window portion including a leading end and a trailing end and comprising:
   a handle pivotally coupled with the leading end, the handle being pivotable between a lock position and a slide position,
   a driving pin coupled with the handle and engaging the track, the driving pin defining a pivot axis for the handle, and
   a guide pin spaced from the driving pin, wherein the guide pin is selectively engageable with the track when the handle is pivoted from the lock position to the slide position,
wherein the guide pin forms part of a locking assembly coupled with the handle and including a forward transition region with a channel, and wherein with the sliding window in the closed position, the driving pin and the guide pin are positioned in the channel.

9. A sliding window assembly according to claim 8, wherein the channel comprises a first leg substantially perpendicular to the track and a second leg aligned with the track, wherein with the sliding window portion in the closed position and the handle in the lock position, the driving pin and the guide pin are disposed in the first leg, and wherein when the handle is pivoted to the slide position, the driving pin and the guide pin are displaced into the second leg in alignment with the track.

* * * * *